Sept. 26, 1950 F. MEYER 2,523,873

THRUST DISK FOR SUPPORTING AXLES
IN MOVEMENTS OF TIMEPIECES
Filed July 16, 1948

Inventor
Friedrich Meyer

UNITED STATES PATENT OFFICE 2,523,873

THRUST DISK FOR SUPPORTING AXLES IN MOVEMENTS OF TIMEPIECES

Friedrich Meyer, Grenchen, Switzerland, assignor to Felsa S. A., Grenchen, Switzerland Application July 16, 1948, Serial No. 38,963
In Switzerland July 23, 1947

1 Claim. (Cl. 58—59)

This invention relates to a thrust disc for supporting axles in movements of timepieces.

In watchmaking there are certain design problems, such as in watch movements with a center seconds hand, for which the axial play of a shaft must be limited by a bridge in one direction and by a thrust disc in the other direction. In the above-mentioned case of the center seconds hand, this thrust disc serves for taking-up axial play of the shaft of the center seconds hand, which shaft is inserted into the ordinary gearing. This thrust disc is commonly fixed by means of a screw provided on an adjacent bridge. In arrangements hitherto used, the hole of the thrust disc for receiving the seconds hand shaft had to be exactly concentrical to the bore of the hollow minute shaft. Hitherto, fixing the thrust disc was difficult in that sufficient thickness was not available and exact centering was difficult to be obtained.

The thrust disc of the invention remedies these inconveniences. It comprises slots on opposite sides of the hole receiving the axle or shaft to be supported, these slots providing for an elastic deformation of the thrust disc in order to allow lateral insertion of the axle.

Another object of the invention is to provide on the thrust disc a hole receiving a pin driven into any fixed part of the watch movement to determine the position of the disc.

Other objects and features will be apparent as the following description proceeds, reference being had to the accompanying drawings showing, by way of example, one embodiment of the invention, and wherein.

Figure 1:
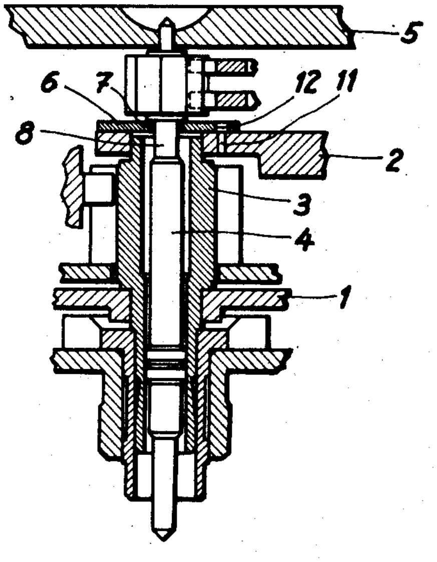
Fig. 1 is a section through the axis of the minute shaft of a watch movement on which the thrust disc is mounted.
Figure 2:
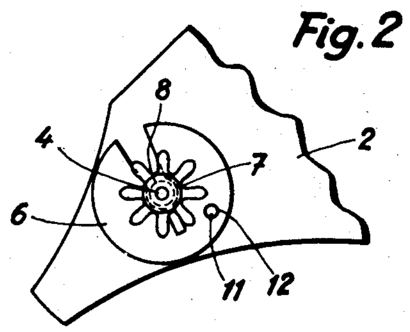
Fig. 2 is a top view of the thrust disc with the upper bridge removed.

Referring now to Figs. 1 and 2, 1 designates the plate of a watch movement. On this plate and on a bridge 2 is mounted a hollow minute shaft 3. The shaft 4 for a center seconds hand not shown is carried on the wall of the bore of the hollow minute shaft 3 and on a bridge 5.

Figure 3:
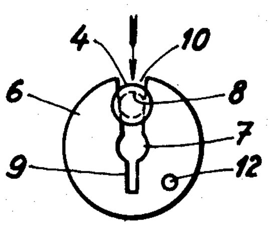
Fig. 3 is a top view of the thrust disc with the axle to be supported partly inserted.

For taking-up axial play of the shaft 4, a thrust disc 6 is provided which is especially shown in Fig. 3. This disc has a central hole 7 for receiving a neck 8 of the shaft 4 of the center seconds hand. This thrust disc is thin and is cut out of elastic material. It comprises a slot 9 and, diametrically opposite, a slot 10. This disc 6 is designed in such a way that the neck 8 may be inserted into the hole 7 through the slot 9 after an elastic deformation of the disc 6. The shaft 4 being in the center hole 7 the slots 9 and 10, which were widened during the insertion of the neck 8 are contracted again, so that on a possible dis-assembling of the movement, the thrust disc 6 cannot separate from the shaft 4. The hole 7 is slightly larger in diameter than the neck 8 so that the shaft 4, when in its position as shown in Fig. 2, is free to rotate in the thrust disc.

The thrust disc has also a hole 12 arranged eccentrically, receiving a pin 11 engaging the bridge 2 in order to secure the thrust disc 6 against rotation.

What I claim is:

In a movement for timepieces, supporting means, a shaft mounted on said supporting means, a frame part, a thrust disc for supporting said shaft axially, comprising a hole receiving said shaft, and slots at opposite sides of said hole in order to allow elastic deformation of said thrust disc for lateral insertion of said shaft through one of said slots, and a fixing means connecting said thrust disc with said frame part to secure said disc against rotation.

FRIEDRICH MEYER.

REFERENCES CITED

The following references are of record in the file of this patent:

UNITED STATES PATENTS

| Number | Name | Date |
|---|---|---|
| 463,625 | Hastings | Nov. 24, 1891 |

FOREIGN PATENTS

| Number | Country | Date |
|---|---|---|
| 226,857 | Switzerland | Oct. 1, 1943 |
| 643,444 | France | May 16, 1928 |
| 691,846 | Germany | June 6, 1940 |